United States Patent
Egashira

(10) Patent No.: US 10,730,268 B2
(45) Date of Patent: Aug. 4, 2020

(54) DECORATIVE LAMINATED SHEET, STRUCTURE INCLUDING THE DECORATIVE LAMINATED SHEET, AND METHOD OF MANUFACTURING THE SAME

(71) Applicant: 3M INNOVATIVE PROPERTIES COMPANY, St. Paul, MN (US)

(72) Inventor: Ken Egashira, Chigasaki (JP)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 14/655,367

(22) PCT Filed: Dec. 19, 2013

(86) PCT No.: PCT/US2013/076481
§ 371 (c)(1),
(2) Date: Jun. 25, 2015

(87) PCT Pub. No.: WO2014/105615
PCT Pub. Date: Jul. 3, 2014

(65) Prior Publication Data
US 2015/0321452 A1    Nov. 12, 2015

(30) Foreign Application Priority Data

Dec. 27, 2012 (JP) .................................. 2012-286069

(51) Int. Cl.
*B32B 15/095* (2006.01)
*B29C 45/14* (2006.01)
(Continued)

(52) U.S. Cl.
CPC ............ *B32B 15/095* (2013.01); *B29C 43/18* (2013.01); *B29C 43/56* (2013.01); *B29C 45/14* (2013.01);
(Continued)

(58) Field of Classification Search
CPC ..................................................... B32B 15/095
See application file for complete search history.

(56) References Cited

U.S. PATENT DOCUMENTS 4,735,988 A * 4/1988 Takada ................... C08L 23/12
 524/426
5,082,595 A * 1/1992 Glackin ................. C09J 201/00
 252/510

(Continued)

FOREIGN PATENT DOCUMENTS

EP      2153976 A1 *  2/2010
JP      S54132675     10/1979
(Continued)

OTHER PUBLICATIONS

Machine_English_translation_JP_2009155645_A; Kawakami, K; Hot-Melt Adhesive Sheet; Jul. 16, 2009; JPO; whole document.*
(Continued)

*Primary Examiner* — Tahseen Khan
(74) *Attorney, Agent, or Firm* — Philip P. Soo

(57) ABSTRACT

A decorative laminated sheet with excellent scratch resistance that is capable of adhering to a polyolefin-based resin substrate, and that is a hardly adhesive material, through an extrusion method, a vacuum-pressure molding method, a mold integrated injection molding method, and the like. The decorative laminated sheet includes a surface layer, a design layer, and an adhesive layer containing a polymer having a propylene unit of 85 mass % or more, in that order.

19 Claims, 3 Drawing Sheets

(51) Int. Cl.
*B29C 43/56* (2006.01)
*B29C 43/18* (2006.01)
*B32B 15/085* (2006.01)
*B29C 48/15* (2019.01)
*B32B 7/12* (2006.01)
*B32B 27/40* (2006.01)
*B32B 27/32* (2006.01)
*B44C 5/04* (2006.01)
*B44C 1/10* (2006.01)
*B32B 15/08* (2006.01)
*B32B 27/36* (2006.01)
*B32B 27/08* (2006.01)
*B29K 75/00* (2006.01)
*B29K 105/00* (2006.01)
*B29L 9/00* (2006.01)
*B29L 31/00* (2006.01)

(52) U.S. Cl.
CPC ............... *B29C 48/15* (2019.02); *B32B 7/12* (2013.01); *B32B 15/08* (2013.01); *B32B 15/085* (2013.01); *B32B 27/08* (2013.01); *B32B 27/32* (2013.01); *B32B 27/36* (2013.01); *B32B 27/40* (2013.01); *B44C 1/105* (2013.01); *B44C 5/0453* (2013.01); *B29C 2043/561* (2013.01); *B29K 2075/00* (2013.01); *B29K 2105/256* (2013.01); *B29K 2995/0026* (2013.01); *B29L 2009/00* (2013.01); *B29L 2031/722* (2013.01); *B32B 2255/10* (2013.01); *B32B 2255/26* (2013.01); *B32B 2307/54* (2013.01); *B32B 2307/584* (2013.01); *B32B 2451/00* (2013.01); *Y10T 428/24967* (2015.01); *Y10T 428/2804* (2015.01); *Y10T 428/2848* (2015.01); *Y10T 428/31551* (2015.04)

(56) References Cited

U.S. PATENT DOCUMENTS

| | | | |
|---|---|---|---|
| 5,395,690 A | | 3/1995 | Kawahata |
| 6,929,846 B2 | | 8/2005 | Kamiyama |
| 7,318,905 B2 | | 1/2008 | Iriyama |
| 2002/0009598 A1* | | 1/2002 | Lafave .............. B32B 7/12 |
| | | | 428/421 |
| 2003/0083434 A1* | | 5/2003 | Ouhadi .............. C08L 23/04 |
| | | | 525/80 |
| 2004/0204537 A1 | | 10/2004 | Mori |
| 2005/0037187 A1 | | 2/2005 | Aichholzer et al. |
| 2010/0163173 A1* | | 7/2010 | Chiu .............. C09J 7/35 |
| | | | 156/275.5 |
| 2013/0168011 A1 | | 7/2013 | Mori et al. |
| 2013/0186566 A1* | | 7/2013 | Lotz .............. C09J 123/142 |
| | | | 156/334 |
| 2014/0162032 A1* | | 6/2014 | Egashira .............. B29C 51/10 |
| | | | 428/195.1 |

FOREIGN PATENT DOCUMENTS

| | | |
|---|---|---|
| JP | S57105310 | 6/1982 |
| JP | H01-146742 | 6/1989 |
| JP | S62-28239 A | 3/1993 |
| JP | H05-155976 | 6/1993 |
| JP | H09-234836 | 9/1997 |
| JP | H10-88079 | 4/1998 |
| JP | 2000-043094 | 2/2000 |
| JP | 2002-302526 | 10/2002 |
| JP | 2002-370311 | 12/2002 |
| JP | 2004-262093 | 9/2004 |
| JP | 2006-341388 | 12/2006 |
| JP | 2007-297569 | 11/2007 |
| JP | 2008-246693 | 10/2008 |
| JP | 2009155645 A * | 7/2009 |
| JP | 2010-131901 | 6/2010 |
| JP | 2010-260942 | 11/2010 |
| JP | 2011-056892 | 3/2011 |
| JP | 2012-215799 | 11/2012 |
| WO | WO 2007/014588 | 2/2007 |
| WO | WO 2009/145242 | 12/2009 |
| WO | WO 2012/041838 | 4/2012 |
| WO | WO2012041838 A1 * | 5/2012 |
| WO | WO 2013/003428 | 1/2013 |
| WO | WO2013003428 A2 * | 1/2013 |
| WO | WO 2013/173424 | 11/2013 |

OTHER PUBLICATIONS

Machine_English_translation_EP_2153976_A1; Profile Strip; Feb. 17, 2010; EPO; whole document.*

International Search Report for PCT International Application No. PCT/US2013/076481, dated Apr. 1, 2014, 4 pages.

* cited by examiner

DECORATIVE LAMINATED SHEET, STRUCTURE INCLUDING THE DECORATIVE LAMINATED SHEET, AND METHOD OF MANUFACTURING THE SAME

CROSS REFERENCE TO RELATED APPLICATIONS

This application is a national stage filing under 35 U.S.C. 371 of PCT/US2013/076481, filed Dec. 19, 2013, which claims priority to Japan Application No. 2012-286069, filed Dec. 27, 2012, the disclosures of which are incorporated by reference in their entireties herein.

FIELD OF THE INVENTION

The present invention relates to a decorative laminated sheet, a structure including the decorative laminated sheet and a method of manufacturing the same.

BACKGROUND

A chrome plating replacement film that can be used in an extrusion method, a vacuum-pressure molding method, a mold integrated injection molding method and the like is needed in order to omit harmful chrome plating processing. Furthermore, if the chrome plating replacement film can be used in the extrusion of an automobile belt line molding, a part can be made lighter through a reduction in an amount of stainless steel used, and a problem with metal/resin mixed waste will also not occur. A paint replacement film is effective in improving a work environment because there are no Volatile Organic Compounds (VOC) or any spray mist.

Polyolefin is light, inexpensive, and harmless, and thus most promising as a resin for automobile parts. However, polyolefin-based resins, particularly polypropylene-based resins, are difficult to apply to paint, metal, film and the like, and are referred to as hardly adhesive materials.

The vacuum-pressure molding method and the mold integrated injection molding method are becoming more commonly used as application methods for a decorative film or sheet thereof. Use of these molding methods is required in order to completely cover a deeply-drawn three-dimensional object as this type of three-dimensional object cannot be covered with a decorative film or sheet by conventional manual labor.

Patent Publication No. 3851523B describes a "metallic luster sheet for three-dimensional molding having a transparent thermoplastic resin film, a metal layer, an adhesive layer, and a thermoplastic resin film in that order, wherein the transparent thermoplastic resin film is configured of a polyester-based polymer compound having a cyclohexane ring and a benzene ring in a main chain, or a polyester-based polymer compound having and a naphthalene ring and a benzene ring in a main chain."

Japanese Unexamined Patent Application Publication No. 2006-341388A describes a method that is "A molding method for a thermoforming laminated sheet that molds a thermoforming laminated sheet having 1) a thermoplastic resin film layer, 2) a decorative layer having a metal vapor deposition layer or a highly bright ink layer with metallic luster containing thin metal strips and binding resin, and 3) a supporting substrate resin layer at a molding temperature of $(T_1-20°)$ C. to $(T_2+35°)$ C. Here, $T_1$ is either a softening temperature of the thermoplastic resin film layer or a softening temperature of the supporting substrate resin layer, whichever is higher, and $T_2$ is either the softening temperature of the thermoplastic resin film layer or the softening temperature of the supporting substrate resin layer, whichever is lower."

SUMMARY OF THE INVENTION

It is always desirable to improve the scratch resistance of a decorative film or sheet such as a paint replacement film, a chrome plating replacement film and the like. In particular, chrome plating and stainless steel have high scratch resistance and are thus used in parts that have occasion to make frequent mechanical contact such as an automobile doorknob and the like. Therefore, a chrome plating replacement film is required to have high scratch resistance.

The present invention provides a decorative laminated sheet with excellent scratch resistance that is capable of adhering to a polyolefin-based resin substrate that is a hardly adhesive material through an extrusion method, a vacuum-pressure molding method, a mold integrated injection molding method or the like. Furthermore, the present invention provides a structure that includes such a decorative laminated sheet and a method for manufacture thereof.

In one aspect of the present invention, a decorative laminated sheet is provided that includes a surface layer, a design layer, and an adhesive layer containing a polymer having a propylene unit of 85 mass % or more, in that order.

In another aspect of the present invention, a structure is provided that includes a substrate and a decorative laminated sheet, according to the present invention, that has been applied to a surface of the substrate.

In an additional aspect of the present invention, a method of manufacturing a structure is provided, where the method includes the steps of: preparing the decorative laminated sheet, applying the decorative laminated sheet to the substrate through vacuum-pressure molding, and forming a structure that integrates the decorative laminated sheet and the substrate.

In another aspect of the present invention, a method of manufacturing a structure is provided, where the method includes the steps of: preparing the decorative laminated sheet, extruding or injection molding in a mold a thermoplastic material on the decorative laminated sheet, and forming a structure that integrates the decorative laminated sheet and the thermoplastic material.

According to the present invention, a decorative laminated sheet can be obtained that has high scratch resistance and is capable of adhering to a polyolefin-based resin substrate that is a hardly adhesive material because an overall scratch resistance of a decorative laminated sheet is enhanced by an adhesive layer containing a polymer having a propylene unit of 85 mass % or more.

Note that the description above should not be considered as a complete disclosure of all embodiments of the present invention or of the advantages related to the present invention.

DETAILED DESCRIPTION

A detailed description for the purpose of illustrating representative embodiments of the present invention is given below, but these embodiments should not be construed as limiting the present invention.

A decorative laminated sheet according to an embodiment of the present disclosure includes a surface layer, a design layer, and an adhesive layer containing a polymer having a propylene unit of 85 mass % or more in that order.

Figure 1A:
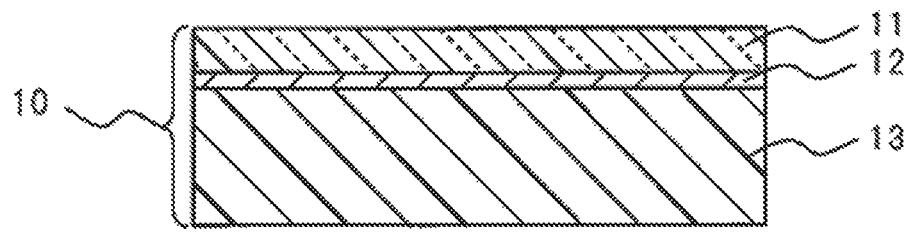
FIG. 1A is a cross-sectional view of a decorative laminated sheet according to an embodiment of the present disclosure.
Figure 1B:
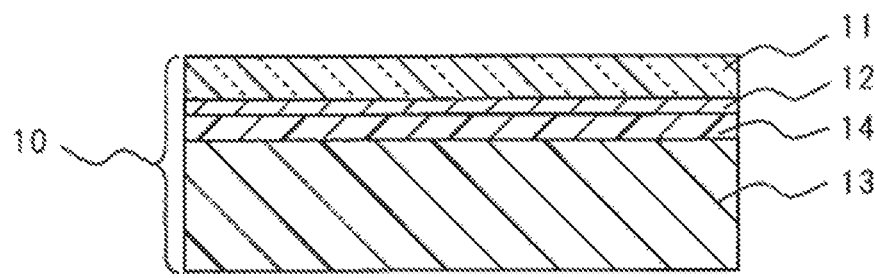
FIG. 1B is a cross-sectional view of a decorative laminated sheet according to another embodiment of the present disclosure.

FIG. 1A illustrates a cross-sectional view of a decorative laminated sheet 10 according to an embodiment of the present disclosure. The decorative laminated sheet 10 includes a surface layer 11, a design layer 12, and an adhesive layer 13. The decorative laminated sheet 10 may also include an additional layer such as a bulk layer, a joining layer, or the like as an optional element. For example, the decorative laminated sheet 10 of another embodiment of the present disclosure illustrated in FIG. 1B has a joining layer 14 between the design layer 12 and the adhesive layer 13 that joins these layers. Under the condition that the surface layer and the adhesive layer are positioned in the outermost layer of the decorative laminated sheet, the number, type, and position of the layers of the decorative laminated sheet are not limited to the above. In the several embodiments, the decorative laminated sheet is made of the surface layer, the design layer, and the adhesive layer or of the surface layer, the design layer, the joining layer joining the design layer and the adhesive layer, and the adhesive layer.

A variety of resins, for example, acrylic resins such as polymethylmethacrylate (PMMA), fluorine resins such as polyurethane, ethylene/tetrafluoroethylene copolymer (ETFE), polyvinylidene fluoride (PVDF), methyl methacrylate/vinylidene fluoride copolymer (PMMA/PVDF) and the like, polyolefins such as polyvinyl chloride (PVC), polycarbonate (PC), polyethylene (PE), polypropylene (PP) and the like, polyesters such as polyethylene terephthalate (PET), polyethylene naphthalate and the like, ethylene/acrylic acid copolymer (EAA) and ionomers thereof, and copolymers such as ethylene/ethyl acrylate copolymer, ethylene/vinyl acetate copolymer, and the like can be used as the surface layer. Due to excellent weather resistance, acrylic resins, polyurethane, fluorine resins, and polyvinyl chloride are preferred, and due to excellent scratch resistance and minimal environmental impact when incinerated or buried as waste, acrylic resins and polyurethane are more preferred.

The surface layer can be formed by coating a resin composition on the design layer that is included in the decorative laminated sheet, and on the bulk layer, the joining layer, and the like that are optional configuration elements. Alternatively, a surface layer film can be formed by coating the resin composition on a different liner, and that film can be laminated on the design layer, the bulk layer, and the like through the joining layer. In the case that the design layer, the bulk layer, and the like are adhesive to the surface layer film formed on the liner, the surface layer film can be laminated directly to these layers without having a joining layer therebetween. For example, the surface layer film can be formed by coating resin material such as a reactive polyurethane composition and the like on a liner or the like using knife coating, bar coating, blade coating, doctor coating, roll coating, cast coating and the like, and heat curing as necessary.

Reactive polyurethane compositions generally include polyols and crosslinking agents. For example, polyester polyols such as acrylic polyol, poly(caprolactone) diol, and the like, polycarbonate polyols such as cyclohexanedimethanol carbonate, 1,6-hexanediol carbonate, and the like, polyether polyols such as polyethylene glycol, polypropylene glycol, and the like can be used as the polyol. Polyisocyanates such as hexamethylene diisocyanate, isophorone diisocyanate, tolylene diisocyanate, methylenebis (4-phenyl isocyanate), 4,4'-methylene bis cyclohexyl diisocyanate (also referred to as hydrogenated MDI, H12MDI, and the like), burettes, isocyanurates, or adducts thereof, and the like can be used as the crosslinking agent. The reactive polyurethane composition may be aqueous or solvent based. When the reactive polyurethane composition is aqueous, further crosslinking can be performed using polycarbodiimide, aziridine, oxazoline, and the like. If the reactive polyurethane composition is aqueous, particularly preferred combinations are polycarbonate-based and polycarbodiimide, 4,4'-methylenebiscyclohexyl diisocyanate and/or aziridine; and if the reactive polyurethane composition is solvent based, particularly preferred combinations are polyester-based and/or glycol-based and isophorone diisocyanate, trimer of isophorone diisocyanate (isocyanurate) and/or 4,4'-methylenebiscyclohexyl diisocyanate.

A surface layer formed into a film beforehand through extrusion, stretching, and the like may be used. This type of film can be laminated on the design layer, bulk layer, and the like through the joining layer. Alternatively, when the design layer, the bulk layer, and the like are adhesive to this type of film, the film can be directly laminated to these layers without having a joining layer therebetween. By using a film with high flatness, a structure can be given an appearance that has higher surface flatness. Furthermore, the surface layer can be formed by multi-layer extrusion with other layers. Polymethylmethacrylate (PMMA) resin, polyacrylic acid butyl resin, ethylene/acrylic copolymer resin, ethylene-vinyl acetate/acrylic copolymer resin, and the like can be used as an acrylic film. An acrylic film has excellent transparency, is resistant to heat and light, and will not easily cause discoloration or luster change when used outdoors. Also, an acrylic film is further characterized by excellent contamination resistance without the use of a plasticizer and the ability to be processed by deep drawing due to excellent moldability. It is particularly preferable to make PMMA the main component.

The thickness of the surface layer may vary but is, in general, approximately 1 µm or more, approximately 5 µm or more, or approximately 10 µm or more, and approximately 100 µm or less, approximately 80 µm or less, or approximately 50 µm or less. When the decorative laminated sheet is applied to a substrate with a complex shape, in terms of shape tracking performance, a thin surface layer is advantageous, for example a thickness of approximately 80 µm or less, or approximately 50 µm or less is preferable. On the other hand, a thick surface layer is more advantageous in terms of giving the structure high light resistance and/or weather resistance, with for example, approximately 5 µm or more, or approximately 10 µm or more being preferable. According to the present disclosure, even when the surface layer is relatively thin at approximately 100 µm or less, and sufficient scratch resistance is not exhibited by the surface layer alone, high scratch resistance can be realized in the decorative laminated sheet overall due to the composition of the adhesive layer, and as a result, the decorative laminated sheet can be made thin.

The surface layer may include, as needed, benzotriazole, ultraviolet absorbers such as Tinuvin 1130 (manufactured by BASF) and the like, and hindered amine light stabilizers (HALS) such as Tinuvin 292 (manufactured by BASF), and the like. Through the use of ultraviolet absorbers, hindered amine light stabilizers, and the like, the decorative laminated sheet can effectively prevent discoloration, fading, deterioration and the like of coloring material, in particular organic pigments that are relatively sensitive to light such as ultraviolet rays and the like, included in the design layer and the like. The surface layer may include hard coating material, a luster giving agent, and the like, and may also have an additional hard coating layer. In order to provide an intended appearance, the surface layer may be transparent, semitransparent or opaque. It is advantageous if the surface layer is transparent.

Examples of the design layer include color layers that exhibit paint colors, metallic colors, and the like, and pattern layers that provide the structure with a wood-like or stone-like pattern, a logo, a picture, and the like. For example, inorganic pigments such as titanium oxide, carbon black, chrome yellow, yellow iron oxide, colcothar, red iron oxide, and the like, phthalocyanine pigments such as phthalocyanine blue, phthalocyanine green, and the like, organic pigments such as azo lake pigments, indigo pigments, perinone pigments, perylene pigments, quinophthalone pigments, dioxazine pigments, quinacridone pigments such as quinacridone red, and the like, bright aluminum material such as aluminum flakes, vapor deposited aluminum flakes, metal oxide-coated aluminum flakes, colored aluminum flakes, and the like, pearl luster material such as mica, synthetic mica, and the like coated with metal oxides such as flake-shaped titanium oxide, iron oxide, and the like, and other pigments dispersed in binder resin can be used as the color layer. As the pattern layer, it is possible to use a film, sheet, metal foil, or the like that has a printed pattern. The thickness of the design layer may vary but, in general, can be approximately 5 μm or more, approximately 10 μm or more, or approximately 20 μm or more, and approximately 300 μm or less, approximately 200 μm or less, or approximately 100 μm or less.

The design layer may also be a metal layer including a metal such as indium, tin, chrome and the like formed on another layer of the decorative laminated sheet through vapor deposition, sputtering and the like. Because this type of metal layer has high luster, it may be suitably used in a chrome plating replacement film, and the like. In this case, the thickness of the design layer may be approximately 5 nm or more, approximately 10 nm or more, or approximately 20 nm or more, and approximately 10 μm or less, approximately 5 μm or less, or approximately 2 μm or less.

The adhesive layer contains a polymer having a propylene unit of approximately 85 mass % or more. The polymer that configures the adhesive layer preferably has a propylene unit of approximately 90 mass % or more, and more preferably approximately 95 mass % or more. Although it is not bound by theory, because the stiffness of the adhesive layer is increased by having a propylene unit content of approximately 85 mass % or more, and because the decorative laminated sheet exhibits resistivity overall against a deformation by an outside force exerted on the surface of the decorative laminated sheet through a fingernail of a user, a car key, and the like, it is thought that the scratch resistance of the decorative laminated sheet is improved.

Propylene-containing copolymers such as propylene homopolymer, ethylene/propylene copolymer, propylene/α-olefin copolymer (for example, propylene/1-butene copolymer, and propylene/1-octene copolymer), ethylene/propylene/α-olefin copolymer (for example, ethylene/propylene/1-butene copolymer, and ethylene/propylene/1-octene copolymer) and the like, and polypropylene-containing thermoplastic polyolefin (TPO) that is a blend of a propylene homopolymer and another rubbery copolymer can be used as the polymer having a propylene unit. Examples of rubbery copolymers included in the polypropylene-containing TPO include the aforementioned propylene-containing copolymers, ethylene/α-olefin/diene copolymers (for example, ethylene/propylene/diene monomer copolymer (EPDM)), butadiene rubbers, isoprene rubbers, natural rubbers and the like, and these rubbery copolymers may be hydrogen adducts and may be crosslinked. When a blend of a propylene homopolymer and another rubbery copolymer is used, it is advantageous to configure the propylene homopolymer to be approximately 80 mass % or more, approximately 85 mass % or more, or approximately 90 mass % or more of the blend. A polymer having a propylene unit selected from a group consisting of propylene homopolymer, ethylene/propylene copolymer, propylene/α-olefin copolymer, ethylene/propylene/α-olefin copolymer, and a blend thereof has good formability when extruded into a film, has excellent resilience, shrink resistance, heat resistance, and the like, can be easily obtained as a commercial item, and is thus preferred from among these. The adhesive layer preferably includes a propylene homopolymer, and when the adhesive layer is made from a propylene homopolymer (propylene unit: 100 mass %) in particular, it is possible to impart even higher scratch resistance to the decorative laminated sheet.

The tensile modulus of the material that configures the adhesive layer is, in general, approximately 350 $N/mm^2$ or more, approximately 400 $N/mm^2$ or more, or approximately 450 $N/mm^2$ or more, and approximately 1000 $N/mm^2$ or less, approximately 800 $N/mm^2$ or less, or approximately 700 $N/mm^2$ or less. A tensile modulus in the aforementioned range can give the decorative laminated sheet sufficient scratch resistance. The tensile modulus can be determined by preparing a 50 mm wide sample, and then measuring the sample in accordance with JIS K7161, between stretch distances of 2 mm and 3 mm, with a grip spacing of 100 mm, and a stretching speed of 200 mm/min.

When a melting point of the adhesive layer is low, peeling and slipping will occur due to stress on a stretched and attached sheet when subjected to heat testing. Heat testing of an automobile exterior is normally conducted at 80° C. based on the maximum temperature of a horizontal painted surface on a summer day. Furthermore, depending on the manufacturer, the heat testing is required to be conducted at 90° C., and some at 100° C. Heat testing of an automobile interior is required to be conducted at at least 100° C. based on the maximum temperature of a dashboard in the summer, and in many cases, heat testing is required to be conducted at 110° C. Since an adhesive layer with a melting point of approximately 20° C. or more higher than the testing temperature is needed in order to withstand these temperatures over long periods of time, an adhesive layer melting point of approximately 100° C. or more, approximately 110° C. or more, approximately 120° C. or more, or approximately 130° C. or more is preferred. The melting point of the adhesive layer is determined by using a differential scanning calorimeter (DSC device Q2000; manufactured by TA Instruments) and measuring the endothermic peak temperature (melting point) from the cyrstallinity (ΔH(J/g)) and the melting of crystal. The melting point of the adhesive layer is measured by raising the temperature at a rate of 10° C./min in a 50 mL/min nitrogen gas atmosphere in a measured temperature range of from 0° C. to 200° C. using a 3 mg sample.

An adhesive layer formed into a film beforehand through extrusion, stretching and the like may be used. This type of film can be laminated on the design layer, bulk layer, and the like through the joining layer. Alternatively, when the design layer, the bulk layer and the like are adhesive to this type of film, these layers can be laminated directly to the film without having a joining layer therebetween. Extruded film, in particular extruded film that has not been stretched, is preferred due to low crystallinity and excellent adhesiveness with a substrate. A solvent diluted composition including components that constitute the adhesive layer is coated on a liner, and the solvent is removed to form an adhesive layer film, and this film can be laminated on the design layer, the bulk layer, and the like through the joining layer. When the design layer, the bulk layer, and the like are adhesive to the adhesive layer film, these layers can be coated or laminated directly to the adhesive layer film without having a joining layer therebetween. The adhesive layer can be formed through multi-layer extrusion with other layers.

Examples of films that can be used as the adhesive layer include FX-333 (a blend of propylene homopolymer and ethylene/propylene/1-butene copolymer; propylene unit percentage: 95.1 mass %; manufactured by OJK K.K.), ST-500 (propylene homopolymer film; manufactured by Tatsuta Chemical Co., Ltd.), and the like. Furthermore, a multi-layer film formed by multi-layer extrusion, lamination, and the like can be used as the adhesive layer.

The thickness of the adhesive layer may vary but is, in general, approximately 15 µm or more, approximately 30 µm or more, or approximately 50 µm or more, and approximately 1000 µm or less, approximately 800 µm or less, or approximately 600 µm or less. An adhesive layer thickness of approximately 15 µm or more can impart sufficient scratch resistance in the decorative laminated sheet. On the other hand, an adhesive layer thickness of approximately 1000 µm or less can increase shape tracking performance to the substrate of the decorative laminated sheet.

A variety of resins, for example, acrylic resins that include polymethylmethacrylate (PMMA), polyolefins such as polyurethane, polyvinyl chloride (PVC), polycarbonate (PC), acrylonitrile/butadiene/styrene copolymer (ABS), polyethylene (PE), polypropylene (PP), and the like, polyesters such as polyethylene terephthalate (PET), polyethylene naphthalate, and the like, and copolymers such as ethylene/acrylic acid copolymer, ethylene/ethyl acrylate copolymer, ethylene/vinyl acetate copolymer, and the like can be used as the bulk layer that is an optional element. From the perspectives of strength and impact resistance, polyurethane, PVC, PET, ABS and polycarbonate can be advantageously used as the bulk layer. The bulk layer is a supporting layer for the printing or the metal layer that are the design layer, gives even stretching during molding, and also functions as a protective layer that effectively protects the structure from external punctures and impacts. Furthermore, the thickness of the decorative laminated sheet can be increased by the bulk layer rather than by making the adhesive layer or the surface layer thicker. A thick decorative laminated sheet conceals roughness in the substrate surface, thus making the structure surface smooth. The thickness of the bulk layer may vary, but from the perspective of imparting the decorative laminated sheet with the aforementioned functionality without exerting a negative impact on the formability of the decorative laminated sheet, the thickness of the bulk layer can, in general, be approximately 2 µm or more, approximately 5 µm or more, or approximately 10 µm or more, and approximately 500 µm or less, approximately 200 µm or less, or approximately 100 µm or less. The scratch resistance of the decorative laminated sheet can be increased even more when the bulk layer is used.

The joining layer may be used to join the aforementioned layers. Generally used adhesives such as a solvent-type, emulsion-type, pressure-sensitive type, heat-sensitive type, and heat or ultraviolet-cured type adhesives, including acrylics, polyolefins, polyurethanes, polyesters, rubbers, and the like can be used as the joining layer, and a heat-cured polyurethane adhesive can be advantageously used. The thickness of the joining layer is, in general, approximately 1 µm or more, approximately 2 µm or more, or approximately 5 µm or more, and approximately 100 µm or less, approximately 50 µm or less, or approximately 20 µm or less.

The surface layer, adhesive layer, bulk layer and/or joining layer may also include the same coloring material such as the inorganic pigments, organic pigments, bright aluminum material, pearl luster material, and the like described for the design layer. If the adhesive layer is a multi-layered adhesive layer, the coloring material may be included in one or a plurality of layers of the layers included in the adhesive layer. When the area stretching ratio of a decorative laminated sheet having a design layer such as a color layer and the like becomes large, that is, is stretched significantly, the color exhibited by the design layer can change, and foundation substrate concealing ability may be reduced; however, by coloring the adhesive layer placed between the design layer and the substrate with titanium oxide, high concealing properties can be realized without exerting an impact on formability or adhesive force even when the decorative laminated sheet is stretched significantly. Furthermore, in a decorative laminated sheet in which the design layer includes a metal layer such as a vapor-deposited indium film and the like, and which is used as a chrome plating replacement film for example, the foundation substrate concealing ability can be increased by including carbon black in the adhesive layer thereof. It is advantageous that the amount of titanium oxide or carbon black included in the adhesive layer be approximately 0.1 mass % or more, approximately 0.2 mass % or more, or approximately 0.5 mass % or more, and approximately 20 mass % or less, approximately 10 mass % or less, or approximately 5 mass % or less of the adhesive layer.

The thickness of the decorative laminated sheet is, in general, approximately 16 µm or more, approximately 25 µm or more, or approximately 50 µm or more, and approximately 2000 µm or less, approximately 1000 µm or less, or approximately 500 µm or less. By making the thickness of the decorative laminated sheet within the aforementioned range, the decorative laminated sheet can be made to sufficiently conform to a substrate with a complex shape, and thus a structure with excellent appearance can be provided.

The scratch resistance of the decorative laminated sheet can be evaluated through pencil hardness in accordance with JIS K5600-5-4. The pencil hardness of the decorative laminated sheet of an embodiment is 2B or more when measured by fixing the decorative laminated sheet on a glass plate with the adhesive layer facing the surface of the glass plate and then scratching the surface layer at a speed of 600 mm/min. The pencil hardness of the decorative laminated sheet can be 6B or more, 5B or more, 4B or more, or 3B or more.

The method of manufacturing the decorative laminated sheet is not particularly limited. The layers can be manufactured as already described. The decorative laminated sheet can be manufactured by, for example, forming and then laminating each layer on a liner of PET film and the like having a release treated surface. Alternatively, the layers can be sequentially laminated on a single liner by repeating a coating process and, as needed, a curing process. The decorative laminated sheet can be formed by multi-layer extruding the material of each layer.

Figure 2:
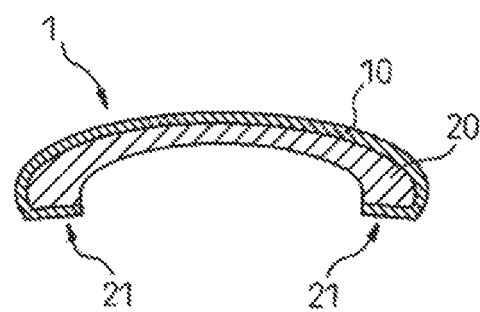
FIG. 2 is a schematic cross-sectional view of a structure according to an embodiment of the present disclosure.

An embodiment of the present disclosure provides a structure including the substrate and the decorative laminated sheet that has been applied to the surface of the substrate. One example of this type of structure is illustrated by the schematic cross-sectional view in FIG. 2. Structure 1 includes a substrate 20 covered by a decorative laminated sheet 10. The decorative laminated sheet 10 includes a surface layer, a design layer, and an adhesive layer containing a polymer having a propylene unit of 85 mass % or more. By applying the decorative laminated sheet 10 to the substrate 20 through vacuum-pressure molding, it is possible to form an integrated structure that integrates the decorative laminated sheet and the substrate. Alternatively, by injecting a thermoplastic material that will be the substrate in the decorative laminated sheet 10 set in an injection molding mold beforehand, the decorative laminated sheet and the injected thermoplastic material can form an integrated structure. Alternatively, by extruding the thermoplastic material that will be the substrate on the decorative laminated sheet 10, the decorative laminated sheet and the extruded thermoplastic material can form an integrated structure. The vacuum-pressure molding, mold integrated injection molding, and extrusion can be performed using conventionally known methods.

The substrate may be a variety of materials, and materials having a variety surfaces and a variety of three-dimensional shapes can be used. The decorative laminated sheet of the present disclosure has excellent adhesion to a polyolefin-based resin substrate. Among polyolefin-based resin substrates, it is advantageous to use a substrate containing a polymer having a propylene unit. Propylene-containing copolymers such as propylene homopolymer, ethylene/propylene copolymer, propylene/α-olefin copolymers (for example, propylene/1-butene copolymer, and propylene/1-octene copolymer), ethylene/propylene/α-olefin copolymers (for example, ethylene/propylene/1-butene copolymer, and ethylene/propylene/1-octene copolymer), and the like, and polypropylene-containing thermoplastic polyolefin (TPO) that is a blend of a propylene homopolymer and another rubbery copolymer can be used as the polymer having a propylene unit included in the substrate. Examples of the rubbery copolymer included in the polypropylene-containing TPO include the aforementioned propylene-containing copolymers, ethylene/α-olefin/diene copolymers (for example, ethylene/propylene/diene monomer copolymer (EPDM)), butadiene rubbers, isoprene rubbers, natural rubbers, and the like, and these rubbery copolymers may be hydrogen adducts and may be crosslinked. Among the aforementioned polymers and blends, materials having thermoplasticity can be used in extrusion. Among these, a polymer having a propylene unit selected from the group consisting of propylene homopolymer, ethylene/propylene copolymer, propylene/α-olefin copolymer, ethylene/propylene/α-olefin copolymer, and a blend thereof has good injection formability as well as excellent shape stability and heat resistance as a molded product and is thus particularly preferable.

The polymer having a propylene unit included in the substrate has a propylene unit of approximately 25 mass % or more, and approximately 100 mass % or less. The propylene unit included in the polymer may be approximately 35 mass % or more, or approximately 50 mass % or more.

An example of a method for applying the decorative laminated sheet to the substrate using the vacuum-pressure molding method is described below while making reference to FIGS. 3A to 3E.

Figure 3A:
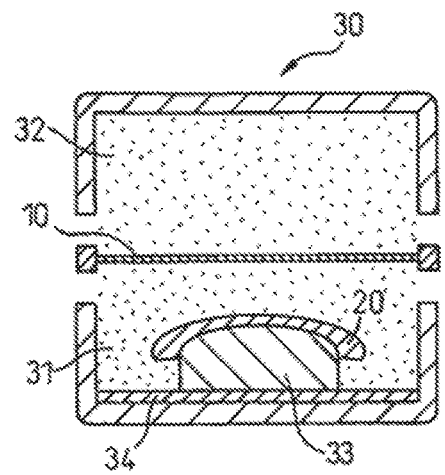
FIGS. 3A to 3E are drawings that schematically describe a process for applying a decorative laminated sheet to a substrate using a vacuum thermocompression bonding apparatus.

As illustrated in FIG. 3A, an exemplary vacuum thermocompression bonding apparatus 30 has a first vacuum chamber 31 and a second vacuum chamber 32 below and above, respectively, and a jig for setting the decorative laminated sheet 10 to be affixed on the substrate 20 that is an adherend between the upper and lower vacuum chambers. Furthermore, a partition plate 34 and a pedestal 33 are placed on a lift table 35 (not illustrated) capable of ascending and descending in the first vacuum chamber 31 on the bottom, and the substrate 20 of a three-dimensional object and the like is placed on this pedestal 33. As this type of vacuum thermocompression bonding apparatus, a commercially available product, for example, a two-sided vacuum molding machine (manufactured by Fu-se Vacuum Forming Ltd.), may be used.

As illustrated in FIG. 3A, the decorative laminated sheet 10 is first placed between the upper and lower vacuum chambers in a state in which the first vacuum chamber 31 and the second vacuum chamber 32 of the vacuum thermocompression bonding apparatus 30 are open to atmospheric pressure. The substrate 20 is set on the pedestal 33 in the first vacuum chamber 31.

Figure 3B:
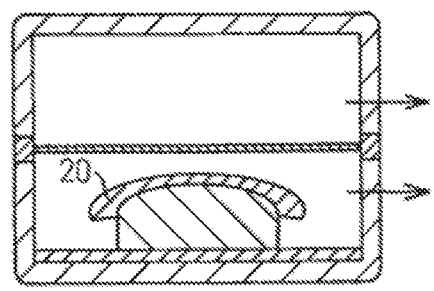
Figure 3C:
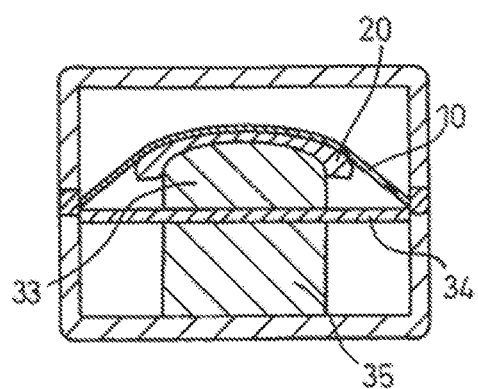

Next, as illustrated in FIG. 3B, the first vacuum chamber 31 and the second vacuum chamber 32 are closed, the respective chambers are depressurized, and a vacuum (for example, to −1 atm in the case when atmospheric pressure is 0 atm) is drawn inside each chamber. The sheet is heated thereafter or simultaneously with drawing of the vacuum. Next, as illustrated in FIG. 3C, the lift table 35 is raised, and the substrate 20 is pushed up to the second vacuum chamber 32. The heating can be performed, for example, using a lamp heater built into a ceiling part of the second vacuum chamber 32.

Figure 3D:
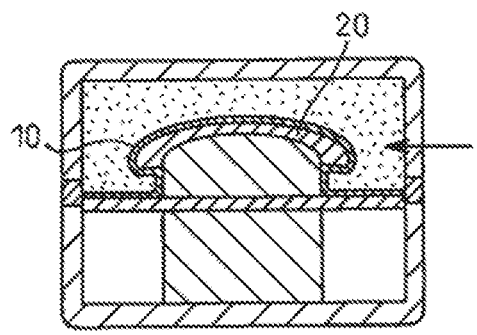

The heated decorative laminated sheet 10 is pressed against the surface of the substrate 20 and stretched. After that, or simultaneously with the stretching, the inside of the second vacuum chamber 32 is pressurized to a suitable pressure (for example, from 2 atm to 0 atm) as illustrated in FIG. 3D. The decorative laminated sheet 10 is firmly adhered to the exposed surface of the substrate 20 by the pressure difference, is stretched to conform to the uneven shape of the exposed surface, and thereby forms a firmly adhered covering on the substrate surface. After performing depressurization and heating in the state in FIG. 3B, the inside of the second vacuum chamber 32 can be pressurized in that state, and the exposed surface of the substrate 20 can be covered with the decorative laminated sheet 10.

Figure 3E:
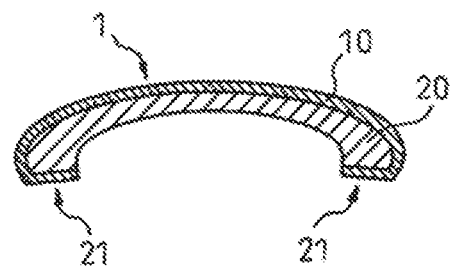

After this, the lower and upper first vacuum chamber 31 and second vacuum chamber 32 are again opened to atmospheric pressure, and the substrate 20 covered with the decorative laminated sheet 10 is removed. As illustrated in FIG. 3E, the edges of the decorative laminated sheet 10, which is firmly adhered to the surface of the substrate 20, are trimmed, and thereby the vacuum-pressure molding process is completed. In this way, the decorative laminated sheet 10 wraps around to the rear surfaces 21 on the ends of the substrate 20 and neatly covers the exposed surface, and thus a structure 1 covered with a good wrapping can be obtained.

The maximum area stretching ratio of the decorative laminated sheet after molding is, in general, approximately 50% or more, approximately 100% or more, or approximately 200% or more, and approximately 1000% or less, approximately 500% or less, or approximately 300% or less. The area stretching ratio is defined as area stretching ratio (%)=(B−A)/A (where A is the area of a portion of the decorative laminated sheet before molding; and B is the area of the portion corresponding to A of the decorative laminated sheet after molding). For example, the area stretching ratio is 150% in a case where the area of a portion of the decorative laminated sheet is 100 cm$^2$ before molding, and then the area becomes 250 cm$^2$ on the surface of the substrate after molding. The maximum area stretching ratio is the value at a location within the overall decorative laminated sheet on the molded product surface having the highest area stretching ratio. For example, when a flat sheet is affixed to a three-dimensional substrate through vacuum-pressure molding or vacuum molding, the portion of a sheet that first affixes to the substrate hardly stretches and has an area stretching ratio of almost 0%, while the ends that are affixed last stretch significantly and achieve an area stretching ratio of 200% or more, and thus the area stretching ratio varies widely depending on the location. Since the acceptability of molding is determined based on whether or not a fault occurs such as non-conformance to the substrate or a tear in the sheet in a portion that was stretched the most, the area stretching ratio in the portion that was stretched the most, that is, the maximum area stretching ratio rather than the average area stretching ratio of the overall molded product becomes the substantial index for the acceptability of the molded product. The maximum area stretching ratio is determined by, for example, printing squares that are 1 mm in each direction on the entire surface of the decorative laminated sheet before molding and then measuring the change in the areas thereof after molding, or by measuring the thickness of the decorative laminated sheet before and after molding.

The decorative laminated sheet of the present disclosure can be used to decorate auto parts, home appliances, vehicles (rolling stock and the like), building materials, and the like, and can be particularly preferably used as a chrome plating replacement film.

EXAMPLE

The following examples describe specific embodiments of the decorative laminated sheet of the present disclosure, but the present invention is not limited thereto. All parts and percentages are based on mass unless otherwise indicated.

The reagents, raw materials, and the like used in these examples are shown below in Table 1.

TABLE 1

| Product name or abbreviation | Description | Supplier |
|---|---|---|
| UW5002 | Aqueous polyurethane emulsion (reactant of cyclohexane dimethanol carbonate, 1,6-hexanediol carbonate, and 4,4'-methylene-bis-cyclohexyl diisocyanate (H12MDI)) | Ube Industries, Ltd. |
| Carbodilite (Registered Trademark) V-02 | Polycarbodiimide-based crosslinking agent | Nisshinbo Chemical Inc. |
| NIPPOLAN (Registered Trademark) 3124 | Polyurethane adhesive (Polyester-based two-component curable) | Nippon Polyurethane Industry Co., Ltd. |
| Placcel (Registered Trademark) 205H | Poly(caprolactone) diol | Daicel Chemical Industries, Ltd. |
| Desmodur (Registered Trademark) Z4470 | Trimer of isophorone diisocyanate | Sumitomo Bayer Co., Ltd. |
| Coronate (Registered Trademark) L-45 | Tolylene diisocyanate crosslinking agent | Soken Chemical & Engineering Co., Ltd. |
| FX-333 | Polyolefin film (100 μm thick) A blend of propylene homopolymer and ethylene/propylene/1-butene copolymer (61.0/13.9/25.1 (by mass)) propylene homopolymer 94.3 mass % propylene unit 95.1 mass % | OJK K.K. |
| RXC-3 | Polyolefin film (100 μm thick) A blend of polypropylene and ethylene/propylene/1-butene copolymer (53.8/27.6/18.6) Polypropylene 75.9 mass % Propylene unit 82.6 mass % | Mitsui Chemicals Tohcello Inc. |
| Black PP film | Propylene homopolymer film (150 μm thick) colored with carbon black (1 mass %) | Hayashi Kazuji Co., Ltd. |
| ST-500 | Propylene homopolymer film (400 μm thick) | Tatsuta Chemical Co., Ltd. |
| PK-002 | Biaxially stretched polypropylene film (40 μm thick) | Oji Specialty Paper Co., Ltd. |
| T68 | PET film (75 μm thick) | Toray Industries, Inc. |
| Milastomer (Registered Trademark) 9020B | Olefin-based thermoplastic elastomer | Mitsui Chemicals, Inc. |

Example 1

A decorative laminated sheet made of 4 layers of an aqueous polyurethane surface layer, an indium vapor deposition film, a polyurethane joining layer, and a polyolefin film adhesive layer was produced according to the following procedure. T68 was coated with an aqueous polyurethane composition including UW5002 and Carbodilite (Registered Trademark) V-02, and the UW5002 was crosslinked with the Carbodilite (Registered Trademark) V-02 by heating in a hot air furnace for 10 minutes at 150° C., and a 30 µm thick surface layer was formed on a PET film. Next, using a vapor deposition device (manufactured by Oike & Co., Ltd.), sheet A was formed by depositing an indium vapor deposition film having a thickness of about 30 nm on the surface layer. Corona treated FX-333 was coated with a solvent-based polyurethane composition including NIPPOLAN (Registered Trademark) 3124 and Coronate (Registered Trademark) L-45, then the solvent was evaporated to form a sheet B having a 10 µm thick polyurethane joining layer and a 100 µm thick polyolefin film adhesive layer. Sheets A and B were laminated so that the indium vapor deposition film and the polyurethane joining layer were brought into contact, then T68 was removed after aging for 3 days at 40° C., and thus the decorative laminated sheet of Example 1 was obtained.

Example 2

A decorative laminated sheet made of 4 layers of a solvent-based polyurethane surface layer, an indium vapor deposition film, a polyurethane joining layer, and a polyolefin film adhesive layer was produced according to the following procedure. PK-002 was coated with a solvent-based polyurethane composition including Placcel (Registered Trademark) 205H and Desmodur (Registered Trademark) Z4470, then the solvent was evaporated by heating for five minutes in a hot air oven at 80° C., and T68 was laminated. After being left to stand for several days at room temperature, the PK-002 was peeled off, and the polyurethane was heated to 150° C. to cure, resulting in the formation of a 55 um thick surface layer on the T68. The indium vapor deposition film was deposited on the surface layer in the same way as for Example 1, and thus sheet A was formed. Sheet B was formed, and sheets A and B were laminated in the same way as for Example 1, and thus the decorative laminated sheet of Example 2 was obtained.

Example 3

Except for replacing FX-333 of Example 1 with a black PP film (a propylene homopolymer film colored with carbon black), the decorative laminated sheet of Example 3 was obtained using the same procedure as used for Example 1.

Example 4

Except for replacing FX-333 of Example 1 with ST-500, the decorative laminated sheet of Example 4 was obtained using the same procedure as for Example 1.

Comparative Example 1

Except for replacing FX-333 of Example 1 with RXC-3, the decorative laminated sheet of Comparative Example 1 was obtained using the same procedure as for Example 1.

Comparative Example 2

Except for replacing FX-333 of Example 2 with RXC-3, the decorative laminated sheet of Comparative Example 2 was obtained using the same procedure as for Example 2.

Comparative Example 3

A belt line molding was formed on the decorative laminated sheet of Comparative Example 2 by extrusion molding using Milastomer (Registered Trademark) 9020B as a thermoplastic resin.

<Evaluation Methods>

The performance of the decorative laminated sheet of the present disclosure was evaluated according to the following method.

1. Decorative Laminated Sheet Scratch Resistance (Pencil Hardness)

The scratch resistance (pencil hardness) of the decorative laminated sheet was evaluated in accordance with JIS K5600-5-4. Specifically, the decorative laminated sheet was fixed to a glass plate with the adhesive layer facing the surface of the glass plate, and the surface layer was scratched five times for each pencil hardness with a 750 g load, a scratching speed of 600 mm/min, a pencil held at 45 degrees and evenly sharpened at the end of the lead so as to make the axial direction of the pencil the normal vector, and a scratching length of 10 mm. The pencil hardness at which visibly detectable scratches were caused two or fewer times out of the five times was taken as the pencil hardness of the decorative laminated sheet. The severity of scratches was determined based on the following standard. The results are given in table 2.

○: Scratches or marks not visibly detectable from a distance of 30 cm directly above the sample.

x: Scratches or marks visibly detectable from a distance of 30 cm directly above the sample.

TABLE 2

|  | Surface layer | Adhesive layer | Pencil hardness | | | | | | | |
|---|---|---|---|---|---|---|---|---|---|---|
|  |  |  | Evaluation | 6B | 5B | 4B | 3B | 2B | B | HB |
| Example 1 | Aqueous polyurethane | FX-333 | B | ○ | ○ | ○ | ○ | ○ | ○ | x |
| Comparative Example 1 | Aqueous polyurethane | RXC-3 | <6B | x | x | x | x | x | x | x |
| Example 3 | Aqueous polyurethane | Black PP film | B | ○ | ○ | ○ | ○ | ○ | ○ | x |
| Example 4 | Aqueous polyurethane | ST-500 | HB | ○ | ○ | ○ | ○ | ○ | ○ | ○ |
| Example 2 | Solvent-based polyurethane | FX-333 | B | ○ | ○ | ○ | ○ | ○ | ○ | x |

TABLE 2-continued

| | Surface layer | Adhesive layer | Evaluation | 6B | 5B | 4B | 3B | 2B | B | HB |
|---|---|---|---|---|---|---|---|---|---|---|
| Comparative Example 2 | Solvent-based polyurethane | RXC-3 | <6B | x | x | x | x | x | x | x |
| Comparative Example 3 | Solvent-based polyurethane | RXC-3 | 4B | ○ | ○ | ○ | x | x | x | x |

The surface layer exhibited a pencil hardness of B in both the aqueous polyurethane (Example 1) and the solvent-based polyurethane (Example 2) cases. With Comparative Example 3, which exhibited higher pencil hardness than Comparative Example 2, it is thought that the extrusion molded belt line molding that was the foundation for the decorative laminated sheet contributed to improving the scratch resistance of the decorative laminated sheet. Accordingly, it is expected that the decorative laminated sheets of Example 1 and Example 2 will also exhibit higher pencil hardness when the foundation is a resin part and the like.

2. Stretched Decorative Laminated Sheet Evaluation

A decorative laminated sheet was clamped in a frame with an opening 260 mm×260 mm in size. The frame having the decorative laminated sheet was fixed in the vacuum-pressure molding chamber of an NGF-0709 vacuum thermocompression bonding apparatus (manufactured by Fu-se Vacuum Forming Ltd.); and a lamp bezel part obtained by injection molding a colorless polypropylene flat plate measuring 150 mm long×70 mm wide×3 mm thick, a polypropylene flat plate colored with carbon black measuring 150 mm long×70 mm wide×3 mm thick, and polypropylene-based polyolefin colored light blue, or an object obtained by lining up side by side the aforementioned colorless polypropylene flat plate and polypropylene flat plate colored with carbon black was placed on a table located below the frame as a substrate. The chamber was closed and, with the atmospheric pressure set to 0.00 atm, the inside of the chamber was depressurized to −0.95 atm or lower, the decorative laminated sheet was heated to 150° C., and by moving the table with the substrate on top upward 80 mm or 100 mm (flat plate), or upward 20 mm (lamp bezel part), and then stopping the table, the decorative laminated sheet was pressed against the substrate while being stretched. In this way, the decorative laminated sheet was wrapped around the substrate, and thus a sample was obtained.

(1) Concealing Properties (Color Difference)

The concealing properties (color difference) of the sample in which the decorative laminated sheet was applied to the substrate having the colorless polypropylene flat plate and polypropylene flat plate colored with carbon black lined up side by side were evaluated. The film draw ratio varied based on the distance the table moved (80 mm or 100 mm) during vacuum-pressure molding and the in-plane position of the flat plates. The draw ratio became larger as the distance the table moved during vacuum-pressure molding became longer and, furthermore, the draw ratio became radially larger toward the periphery from the center of the substrate when the 2 flat plates were viewed as one substrate. For example, when the distance moved was 80 mm, the draw ratio of the center portion of the substrate was 1.5 times, and the draw ratio at the four corners was 2.2 times. Furthermore, when the distance moved was 100 mm, the draw ratio of the center portion was 2.0 times, and the draw ratio at the four corners was 3.0 times.

For regions of the colorless polypropylene flat plate and the polypropylene flat plate colored with carbon black corresponding to the same draw ratio, the color difference ΔE* between these regions was measured using a Spectraflash SF-600 (manufactured by DataColor). A color difference of less than 1.5 is not a problem. A color difference of less than 2.5 in the initial state is a failure (note that a color difference of less than 2.5 after the weathering test is within the acceptable range). A color difference of 2.5 or more in either the initial state or after the weathering test is a failure. The results are shown in Table 3.

TABLE 3

| | Adhesive layer | Color difference ΔE* Draw ratio | | |
|---|---|---|---|---|
| | coloring | 1.5 | 2.0 | 3.0 |
| Example 3 | Yes | 0.2 | 1.2 | 0.9 |
| Example 1 | None | 1.1 | 5.4 | 13.7 |
| Comparative example 1 | None | 2.2 | 6.4 | 11.2 |

(2) Concealing Properties (Visual Test)

The sample of the decorative laminated sheet applied to the lamp bezel part was observed visually. In the sidewall regions of the lamp bezel part that were stretched significantly, samples with the decorative laminated sheet of either Example 1 or Comparative Example 1 wrapped therearound looked blue due to low decorative laminated sheet concealing properties. In contrast, a blue color of the lamp bezel part was not observed in a sample with the decorative laminated sheet of Example 3 wrapped therearound.

(3) Scratch Resistance (Pencil Hardness)

The pencil hardness of a region of a sample, obtained using the colorless polypropylene flat plate, stretched 1.7 times or 2.7 times, and the pencil hardness of a sample obtained using the lamp bezel part were evaluated in accordance with the aforementioned scratch resistance (pencil hardness) evaluation procedure. The results are shown in Table 4.

TABLE 4

| | Draw ratio | Adhesive layer | Substrate | Pencil hardness evaluation |
|---|---|---|---|---|
| Example 1 | 1.7 | FX-333 | Colorless PP flat plate | B |
| | 2.7 | | | B |
| | — | | Lamp bezel | B |
| Comparative example 1 | 1.7 | RXC-3 | Colorless PP flat plate | 3B |
| | 2.7 | | | 3B |
| | — | | Lamp bezel | 3B |
| Example 3 | 1.7 | Black PP film | Colorless PP flat plate | HB |
| | 2.7 | | | HB |
| | — | | Lamp bezel | HB |

(4) Adhesive Force

A region 10 mm wide×100 mm long was cut from a sample obtained using the colorless polypropylene flat plate, and peeling force or force at breaking (N/10 mm) was measured twice while 180° peeling was performed at 200 mm/min and 25° C. The results are shown in Table 5. There are said to be no practical problems as long as the adhesive force of an automobile decorative film is 6.4 N/mm or more.

TABLE 5

| | Draw ratio | Adhesive layer | Adhesive force (N/10 mm) | |
|---|---|---|---|---|
| | | | First time | Second time |
| Example 1 | 2.0-2.2 | FX-333 | 16.3 (break) | 19.3 (break) |
| | 2.7-3.0 | | 17.1 (break) | 19.4 (break) |
| Comparative Example 1 | 2.0-2.2 | RXC-3 | 19.0 (break) | 18.9 (break) |
| | 2.7-3.0 | | 16.3 (break) | 18.0 (break) |
| Example 3 | 2.0-2.2 | Black PP film | 16-18 (break) | 16-19 (break) |
| | 2.7-3.0 | | 17.7 (break) | 12-14 (break) |

(5) Measurement of the Tensile Modulus of the Polyolefin Adhesive Layer Film

An adhesive layer film was cut to a width of 50 mm with a sharp blade, and a load A (N) at a stretch distance of 2 mm and a load B (N) at a stretch distance of 3 mm were determined using an Autograph AGS-X (manufactured by Shimadzu Corporation) with a grip spacing of 100 mm and a stretching speed of 200 mm/min. With the film thickness as C (mm), the tensile modulus measured between 2 mm and 3 mm stretch distances was determined through the following equation in accordance with JIS K7161. The results are shown in Table 6.

Tensile modulus (N/mm$^2$)={(load at 3 mm−load at 2 mm)/(2 mm−1 mm)}×{initial grip spacing 100 mm/(film width 50 mm×film thickness $C$ mm)}=2($B$−$A$)/$C$

TABLE 6

| Adhesive layer film | Tensile modulus (N/mm$^2$) |
|---|---|
| FX-333 | 542 |
| RXC-3 | 293 |
| Black PP film | 456 |
| ST-500 | 573 |

What is claimed is:

1. A method of manufacturing a structure, the method comprising the steps of:
    preparing a decorative laminated sheet comprising, in the following order:
        a surface layer having a thickness in the range of from 1 to 100 μm and comprising an acrylic resin, polyurethane, fluorine resin or polyvinyl chloride,
        a design layer, and
        an adhesive layer having a thickness in the range of from 15 to 1000 μm and containing either an unblended propylene homopolymer or a blend of propylene homopolymer and a rubbery copolymer, wherein the blend has approximately 95 mass % or more of propylene units, and
        the adhesive layer is configured of a material having a tensile modulus in the range of from approximately 350 N/mm$^2$ to approximately 1000 N/mm$^2$, the adhesive layer has a melting point of approximately 100° C. or more and the decorative laminated sheet has a pencil hardness of 2B or more, and either
    (a) applying the decorative laminated sheet to a substrate through vacuum-pressure molding, and forming a structure that integrates the decorative laminated sheet with the substrate, wherein the substrate comprises a polyolefin-based resin, or
    (b) extruding or injection molding in a mold a thermoplastic material on the decorative laminated sheet, and forming a structure that integrates the decorative laminated sheet and the thermoplastic material, wherein the thermoplastic material comprises a polyolefin-based resin.

2. The method of manufacturing a structure according to claim 1, wherein the design layer comprises a metal layer.

3. The method of manufacturing a structure according to claim 1, wherein the adhesive layer includes a propylene homopolymer.

4. The method of manufacturing a structure according to claim 1, further comprising:
    a bulk layer disposed between the design layer and the adhesive layer,
    wherein a polyurethane, PVC, PET, ABS or polycarbonate material is used as the bulk layer.

5. The method of manufacturing a structure according to claim 1, wherein the adhesive layer is configured of a material having a tensile modulus of approximately 400 N/mm$^2$ or more.

6. The method of manufacturing a structure according to claim 1, wherein the adhesive layer is configured of a material having a tensile modulus of approximately 450 N/mm$^2$ or more.

7. The method of manufacturing a structure according to claim 1, wherein the adhesive layer has a melting point of approximately 110° C. or more.

8. The method of manufacturing a structure according to claim 1, wherein the adhesive layer has a melting point of approximately 120° C. or more.

9. The method of manufacturing a structure according to claim 1, wherein the adhesive layer has a melting point of approximately 130° C. or more.

10. The method of manufacturing a structure according to claim 1, wherein the decorative laminated sheet has a pencil hardness of 3B or more.

11. The method of manufacturing a structure according to claim 1, wherein the decorative laminated sheet has a pencil hardness of 4B or more.

12. The method of manufacturing a structure according to claim 1, wherein the decorative laminated sheet has a pencil hardness of 5B or more.

13. The method of manufacturing a structure according to claim 1 wherein the decorative laminated sheet has a pencil hardness of 6B or more.

14. The method of manufacturing a structure according to claim 1, wherein adhesive layer has a thickness of approximately 800 μm or less.

15. The method of manufacturing a structure according to claim 1, wherein adhesive layer has a thickness of approximately 600 μm or less.

16. The method of manufacturing a structure according to claim 1, wherein the surface layer has a thickness of approximately 80 μm or less.

17. The method of manufacturing a structure according to claim 1, wherein the surface layer has a thickness of approximately 50 μm or less.

18. The method of manufacturing a structure according to claim 1, wherein the surface layer comprises a polyurethane.

19. The method of manufacturing a structure according to claim 18, wherein the surface layer is transparent.

\* \* \* \* \*